United States Patent [19]

Nakamura et al.

[11] 3,906,160

[45] Sept. 16, 1975

[54] HEADPHONE TYPE FM STEREO RECEIVER

[75] Inventors: Shoichi Nakamura, Tondabaya; Eizo Mori, Uji; Yoshiteru Onaka, Kadoma; Tsuneo Okubo, Moriguchi, all of Japan

[73] Assignee: Matsushita Electric Industrial Co., Ltd., Kadoma, Japan

[22] Filed: July 13, 1973

[21] Appl. No.: 378,822

Related U.S. Application Data

[63] Continuation of Ser. No. 222,271, Jan. 31, 1972, abandoned, which is a continuation of Ser. No. 806,469, March 12, 1969, abandoned.

[30] Foreign Application Priority Data

| | | |
|---|---|---|
| Apr. 12, 1968 | Japan | 43-25114 |
| Apr. 18, 1968 | Japan | 43-26719 |
| Mar. 19, 1968 | Japan | 43-22066[U] |
| Mar. 22, 1968 | Japan | 43-23194[U] |
| Mar. 22, 1968 | Japan | 43-23195[U] |
| Mar. 27, 1968 | Japan | 43-24926[U] |
| Mar. 27, 1968 | Japan | 43-24927[U] |
| Mar. 27, 1968 | Japan | 43-24928[U] |
| Mar. 29, 1968 | Japan | 43-25624[U] |
| Mar. 29, 1968 | Japan | 43-25625[U] |
| Mar. 29, 1968 | Japan | 43-25626[U] |
| Mar. 29, 1968 | Japan | 43-25627[U] |
| Mar. 29, 1968 | Japan | 43-25628[U] |
| Apr. 4, 1968 | Japan | 43-27885[U] |
| Apr. 8, 1968 | Japan | 43-28954[U] |
| Apr. 8, 1968 | Japan | 43-28955[U] |
| Apr. 8, 1968 | Japan | 43-28956[U] |

[52] U.S. Cl. ............. 179/15 BT; 179/1 G; 325/361

[51] Int. Cl. ............................................. H04b 1/08

[58] Field of Search ........ 179/15 BT, 1 G; 325/361, 325/36; 333/3, 4; 350/20

[56] References Cited

UNITED STATES PATENTS

| | | | |
|---|---|---|---|
| 1,695,172 | 12/1928 | Clement | 325/361 |
| 2,554,270 | 5/1951 | Rosenberg | 325/361 |
| 2,678,999 | 5/1954 | Norris | 325/361 |
| 3,029,339 | 4/1962 | Yuan Pan | 350/20 |
| 3,033,930 | 5/1962 | Guzskie | 179/1 |
| 3,122,847 | 3/1964 | Redfield | 325/361 |
| 3,249,873 | 5/1966 | Whittemore | 325/361 |
| 3,569,633 | 3/1971 | Brahman | 179/15 BT |

*Primary Examiner*—Kathleen H. Claffy
*Assistant Examiner*—Tommy P. Chin
*Attorney, Agent, or Firm*—Stevens, Davis, Miller & Mosher

[57] ABSTRACT

A FM stereo receiver in the form of a headphone comprising two phone cases and a head belt bridging said two phone cases, said head belt having accommodated therein a tuner including an antenna for receiving FM stereophonic broadcasting, IF amplifier, a discriminator, a FM stereo signal demodulator, a left and a right audio frequency amplifier and power source means for supplying an electric power to said respective elements, so that FM stereophonic broadcasting may be received solely by said receiver without connecting the receiver with external apparatus.

2 Claims, 33 Drawing Figures

PATENTED SEP 16 1975

3,906,160

SHEET 2

HEADPHONE TYPE FM STEREO RECEIVER

This is a continuation of application Ser. No. 222,271, filed Jan. 31, 1972 which is a continuation of application Ser. No. 804,469, filed Mar. 12, 1969, both now abandoned.

The present invention relates to a type of receiver consisting of an FM stereo receiver and a headphone integrally combined with each other, and to the detailed structure thereof.

The FM stereophonic broadcasting system which started operation in the United States of America since June 1, 1961, has now been employed in various countries including Japan and Germany as a standard system and the demand for FM stereo receivers for receiving stereophonic broadcasting is increasing more and more as the programs of the broadcasting are becoming substantial. However, as is well known, in order to enjoy stereophonic sound to the fullest extent, it is believed to be best to receive the sound in a position in the proximity of one of the vorticos of the regular triangle, defined by the interval between two speakers, which is not occupied by the speakers. This means that a position in which stereophonic sound can be fully enjoyed is strictly limited no matter how wide the room may be. In addition to the foregoing disadvantage, when stereophonic broadcasting is enjoyed in a living room of a house where more than one member of a family is normally present, the stereophonic sound may annoy those who do not wish to listen to it. It is under such circumstances that the trend of enjoying stereophonic broadcasting individually, without annoying other persons, by connecting an FM stereo receiver to headphones has appeared. It is true that the use of headphones for receiving stereophonic broadcasting is advantageous in that the sound reaching both ears expands infinitely and the frequency range of sounds is wide. However, with the conventional headphones of the type described, there has been the disadvantage that the freedom of movement of the wearer is restricted by a cord connecting the headphones with a stereo receiver, like a prisoner on a chain.

The FM stereo receiver according to the present invention is so designed and constructed that the listener can fully enjoy the content of FM stereophonic broadcasting, even while moving around, by only holding the headphones on both ears, without connecting line, and this is believed to be the best FM stereo receiver for individual use.

The present invention will be described with reference to the accompanying drawings which illustrate embodiments of the invention and in which.

Figure 6A:
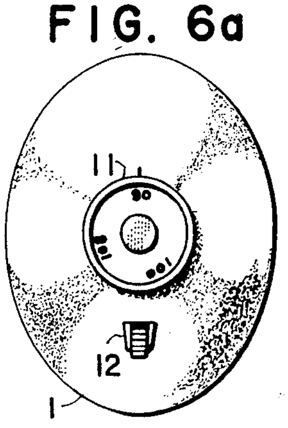
Figure 6B:
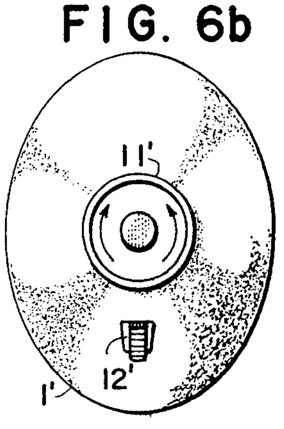
Figure 7:
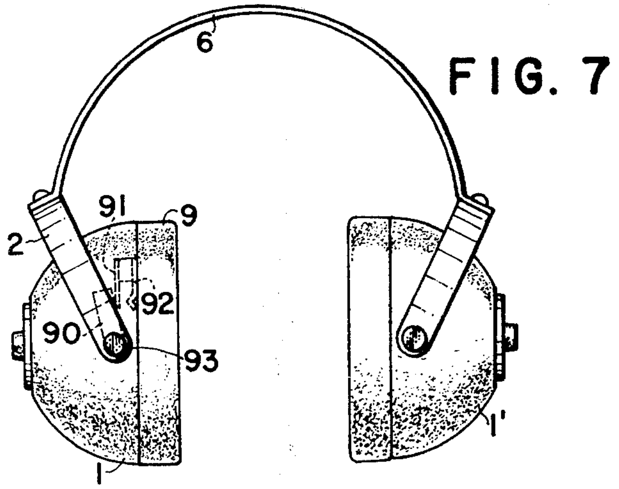
Figures 8, 9, 10:
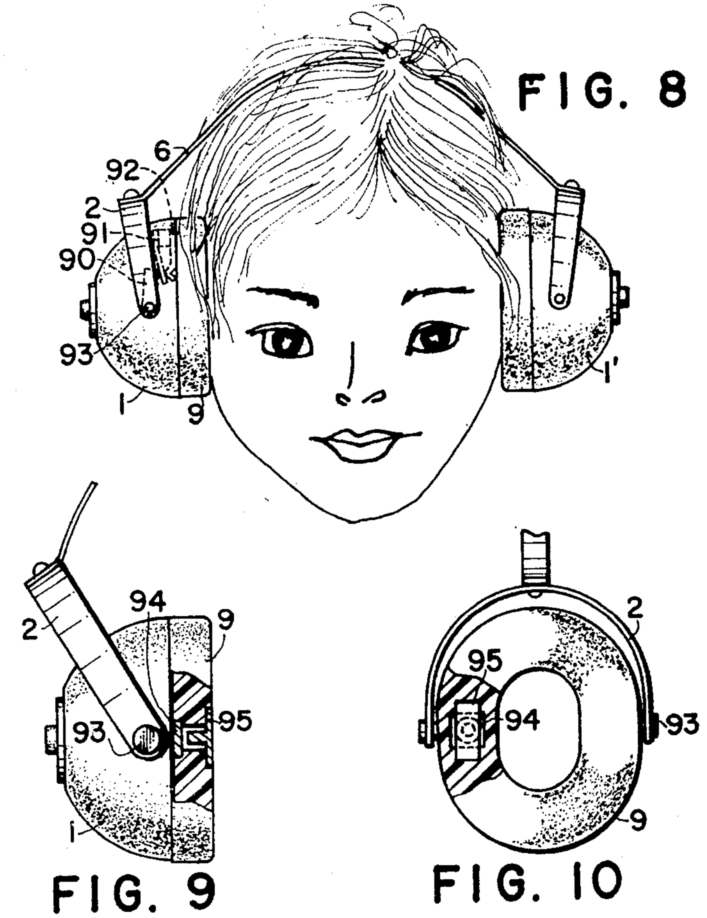
Figure 11:
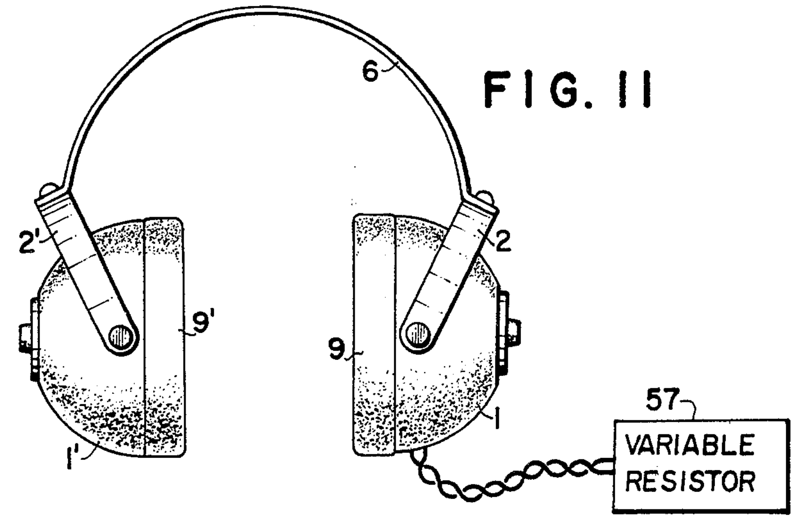
Figure 12:
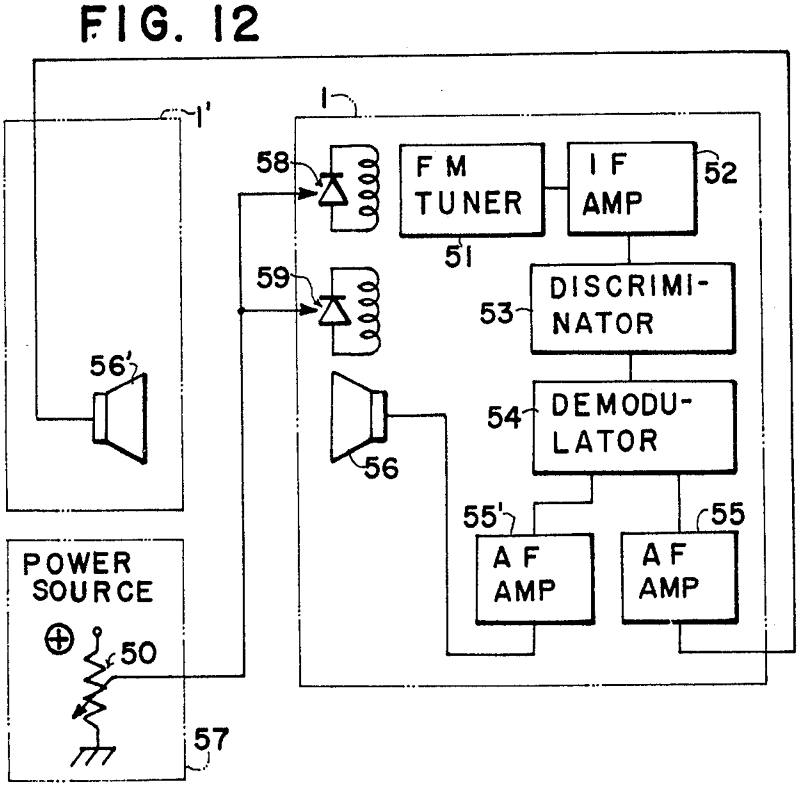
Figure 13:
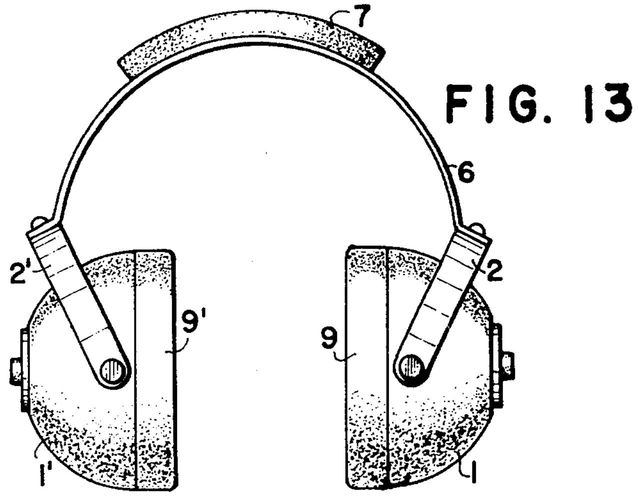
Figure 14:
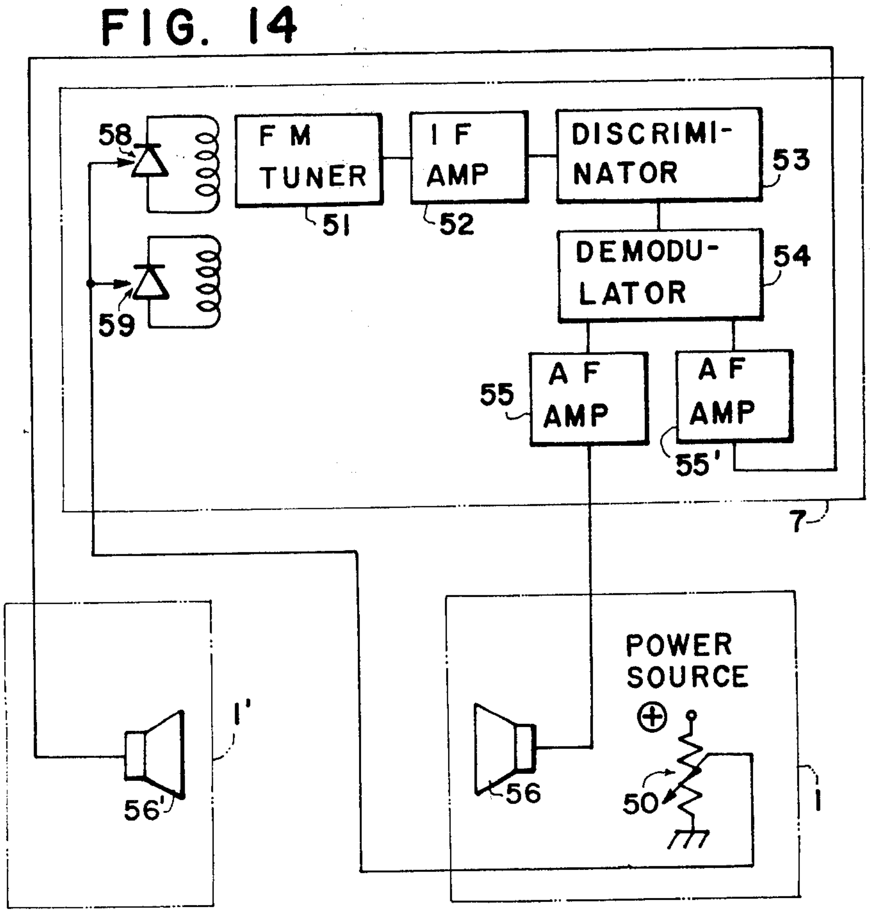
Figure 15:
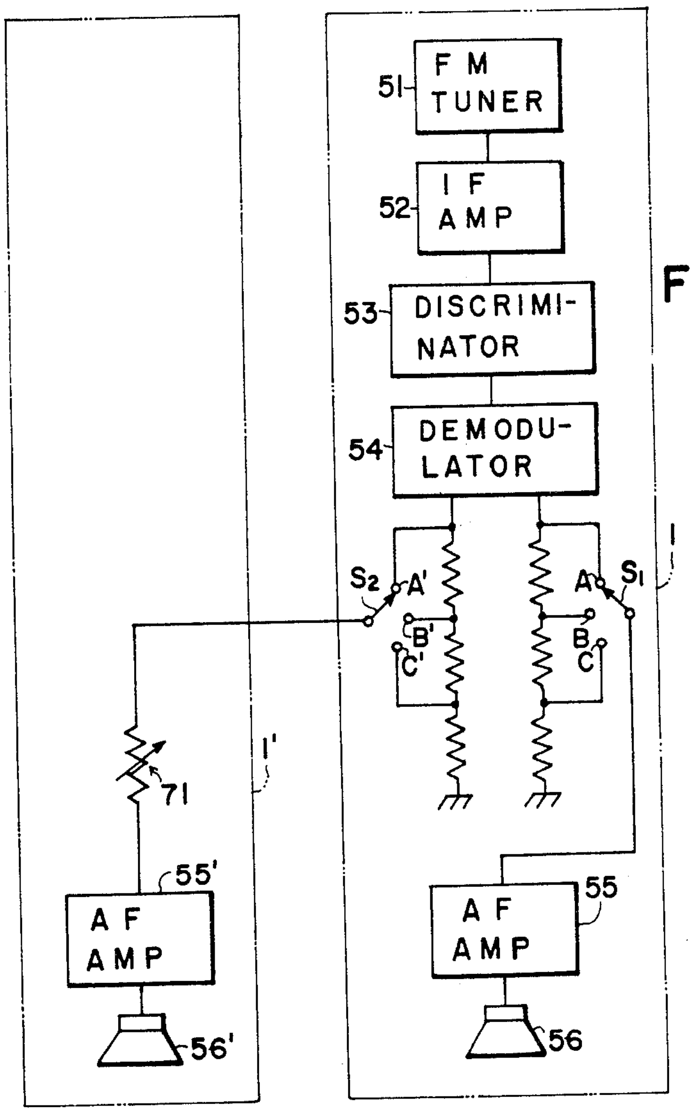
Figure 16:
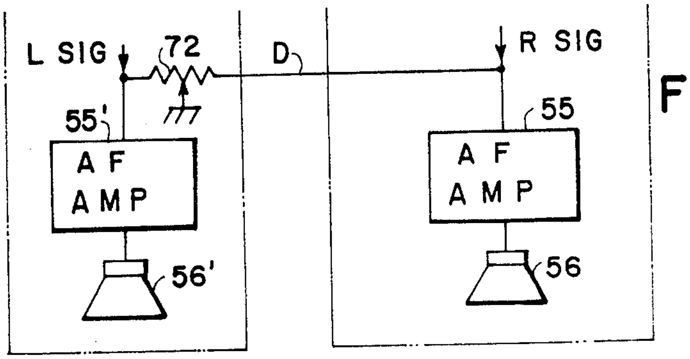
Figure 17:
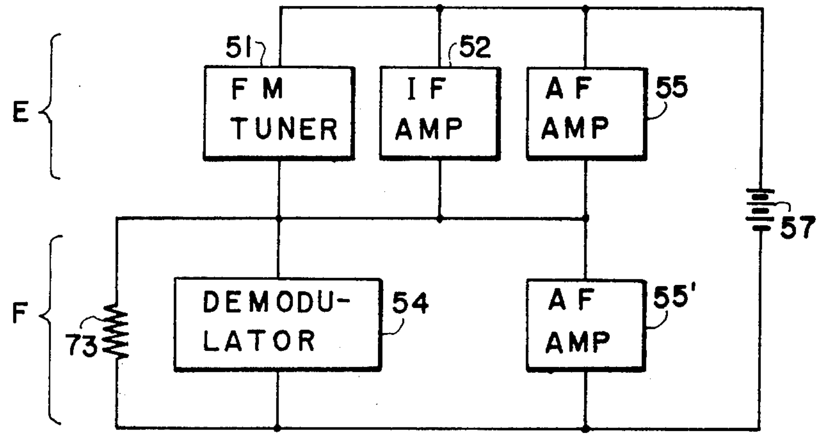
Figure 18:
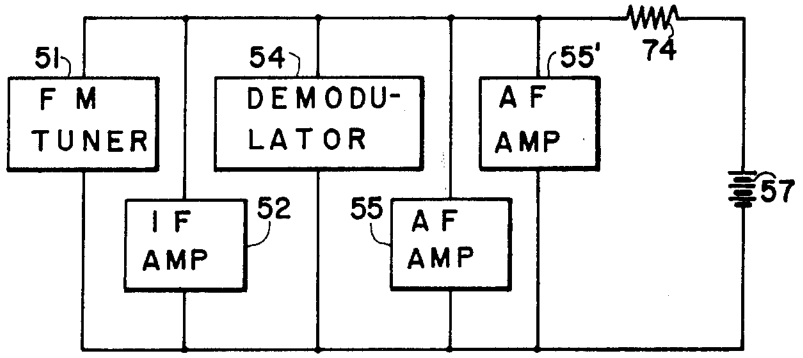
Figure 19:
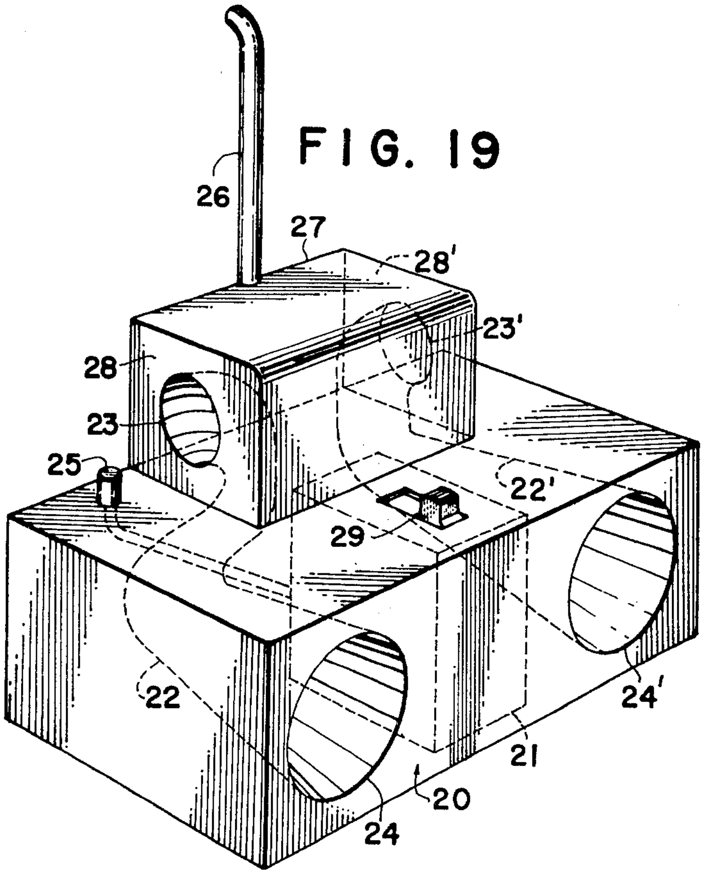
Figure 20:
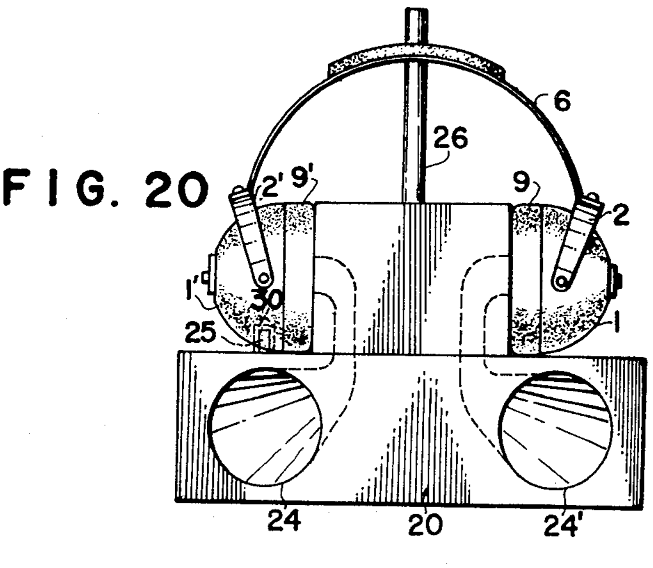
Figure 21:
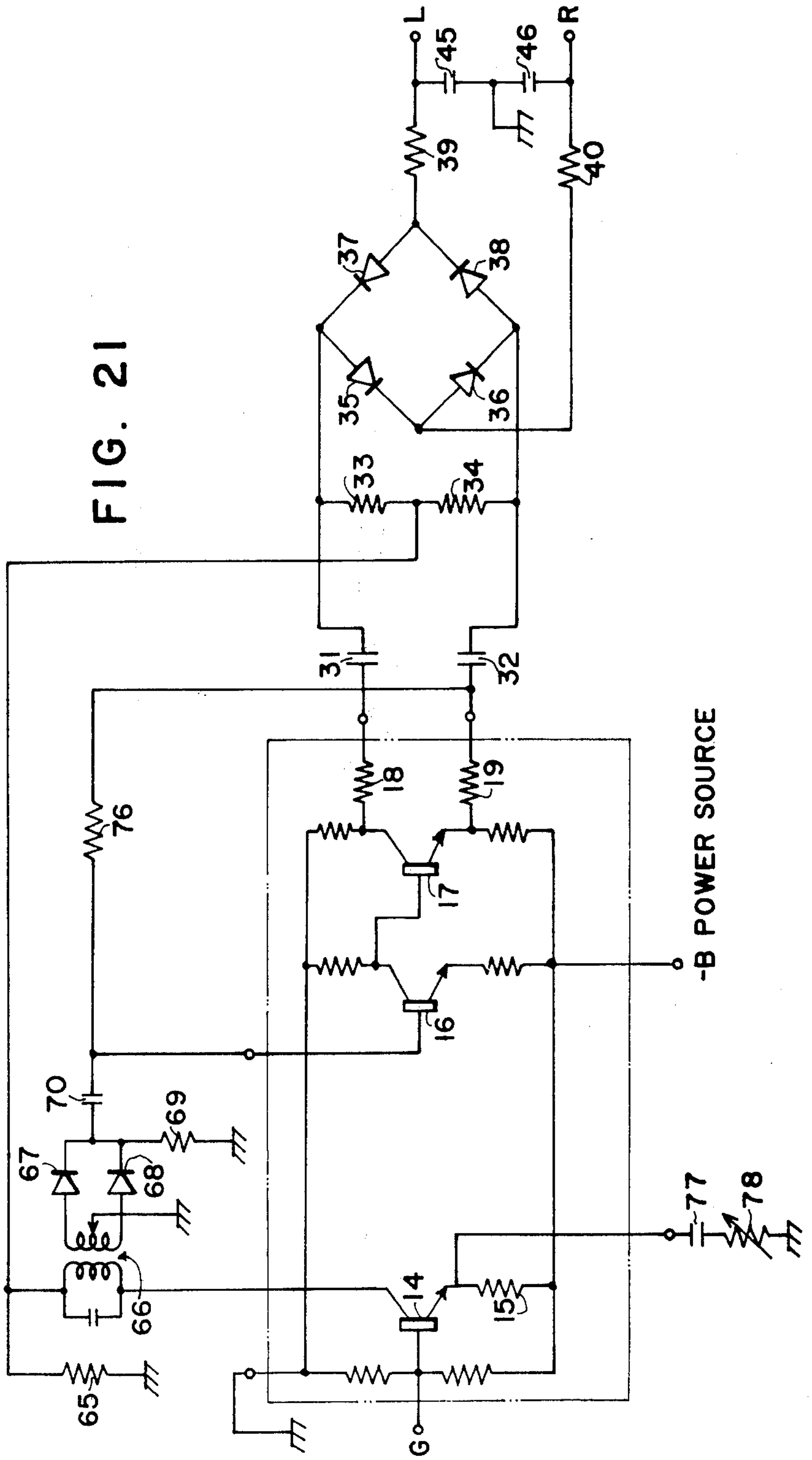
Figure 22:
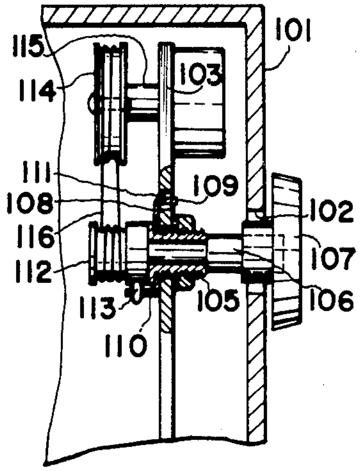
Figure 23:
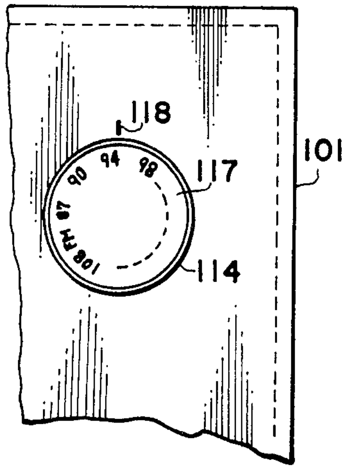
Figure 24A:
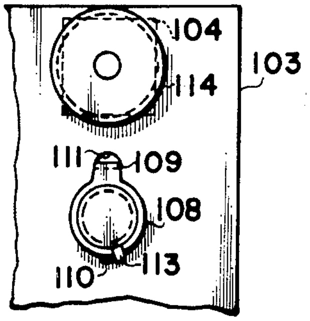
Figure 24B:
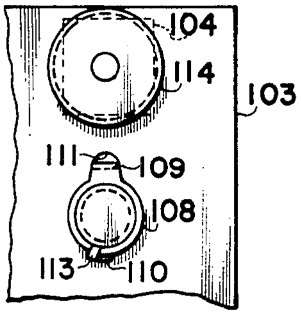
Figure 25:
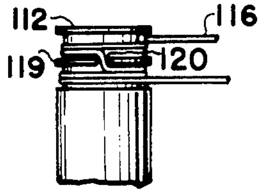
Figure 26:
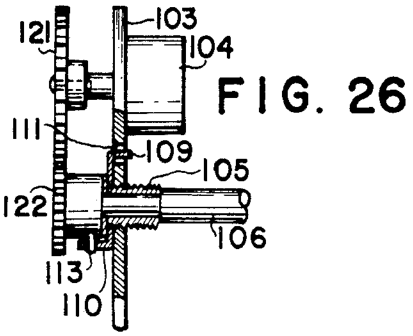
Figure 27:
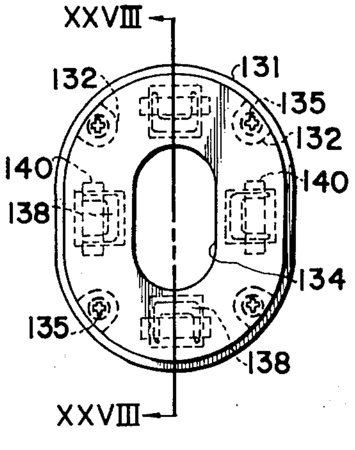
Figure 28:
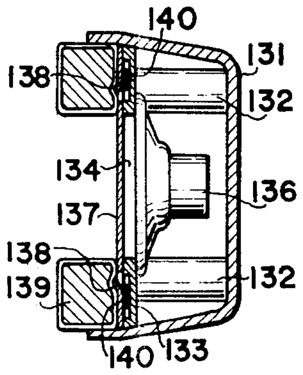
Figure 29:
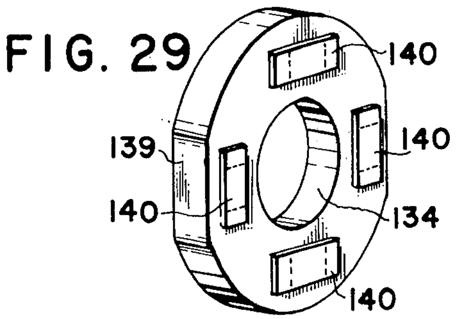
Figure 30A:
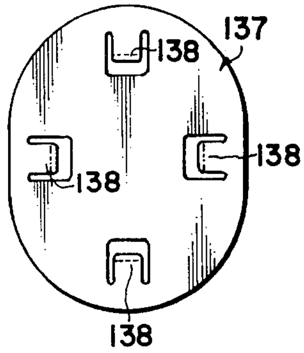
Figure 30B:
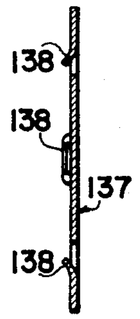

FIGS. 6*a* and 6*b* are a set of views showing phone cases;

FIG. 7 is a front elevation of the receiver of this invention demounted from the hand;

FIG. 8 is a front elevation of the receiver, shown in FIG. 7, mounted on the head;

FIG. 9 is a front elevation of another form of the receiver according to the present invention, with a portion broken away to show the essential portion thereof;

FIG. 10 is a side elevation of the receiver of FIG. 9, with a portion broken away to show the essential portion thereof;

FIG. 11 is a front elevation of still another form of the radio receiver according to the present invention;

FIG. 12 is a block diagram of the radio receiver shown in FIG. 11;

FIG. 13 is a front elevation of still another form of the radio receiver according to the invention;

FIG. 14 is a block diagram of the radio receiver shown in FIG. 13;

FIG. 15 is a block diagram of a phone case, including a volume control, used in the receiver of this invention;

FIG. 16 is a block diagram of a phone case including a volume balancing variable resistor;

FIG. 17 is a block diagram of the receiver of the invention including power source means;

FIG. 18 is a block diagram of the conventional receiver;

FIG. 19 is a perspective view diagrammatically showing a horn unit with charger used in the receiver of this invention;

FIG. 20 is a front elevation of the horn unit of FIG. 19 being used;

FIG. 21 is an electrical connection diagram of a FM stereo signal demodulator unit used in the present invention;

FIG. 22 is a side sectional view of a dial unit used in the present invention;

FIG. 23 is a front elevation of the dial unit shown in FIG. 22;

FIGS. 24*a* and 24*b* are a set of views illustrating the essential portion of the dial unit shown in FIG. 22;

FIG 25 is a side elevation of another form of the dial unit according to the invention;

FIG. 26 is a side sectional view of the essential portion of still another form of the dial unit according to the invention;

FIG. 27 is a front elevation of a headphone provided with fitting means according to the invention;

FIG. 28 is a sectional view taken on the line XXVIII — XXVIII of FIG. 27;

FIG. 29 is a perspective view showing the essential portion of the headphone shown in FIG. 28; and FIG. 30*a* and 30*b* are a front elevation and a side sectional view respectively of the essential portion of the headphone shown in FIG. 28.

First of all, the outline of the FM stereo receiver of this invention will be described with reference to FIGS. 1 and 2.

Figure 1:
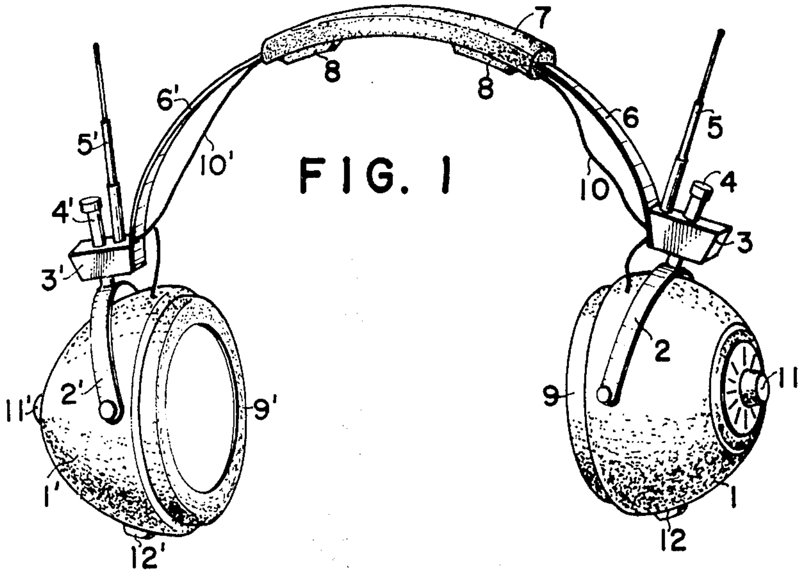
FIG. 1 is a perspective view of the radio receiver of this invention.

Referring to FIG. 1, numerals 1, 1′ designate phone cases. In a conventional headphone, each of the left and right phone cases has only one speaker disposed therein, but according to the present invention all or part of the FM stereophonic broadcasting receiving elements, shown in FIG. 2 and to be described later, are accommodated in each phone case. Numerals 2, 2′ designate supporting members for supporting the respective phone cases and 4, 4′ designate supporting pins respectively having slide cases 3, 3′ slidably mounted thereon, so that the positions of said slide cases may be adjusted in accordance with the distance from the top of the head to the ears. Numerals 5, 5′ designate FM receiving antennas and 6, 6′ designate resilient metal strips by which the phone cases are yieldingly held on the respective ears. Numerals 8, 8' designate head pads and 7 designates a decorative casing covering said head pads. The receiving elements may occasionally be housed in the decorative casing 7 entirely or partially. The practical method of arranging the receiving elements inside or outside the phone cases 1, 1' and the decorative casing 7 will be described later. Numerals 9, 9' designate ear pads; 10, 10' connecting wires extending between both phone cases; 11, 11' elements, e.g. a tuning knob and a volume control knob; and 12, 12' elements, e.g. tone control knob and a power source On-Off switch knob.

Figures 2, 3:
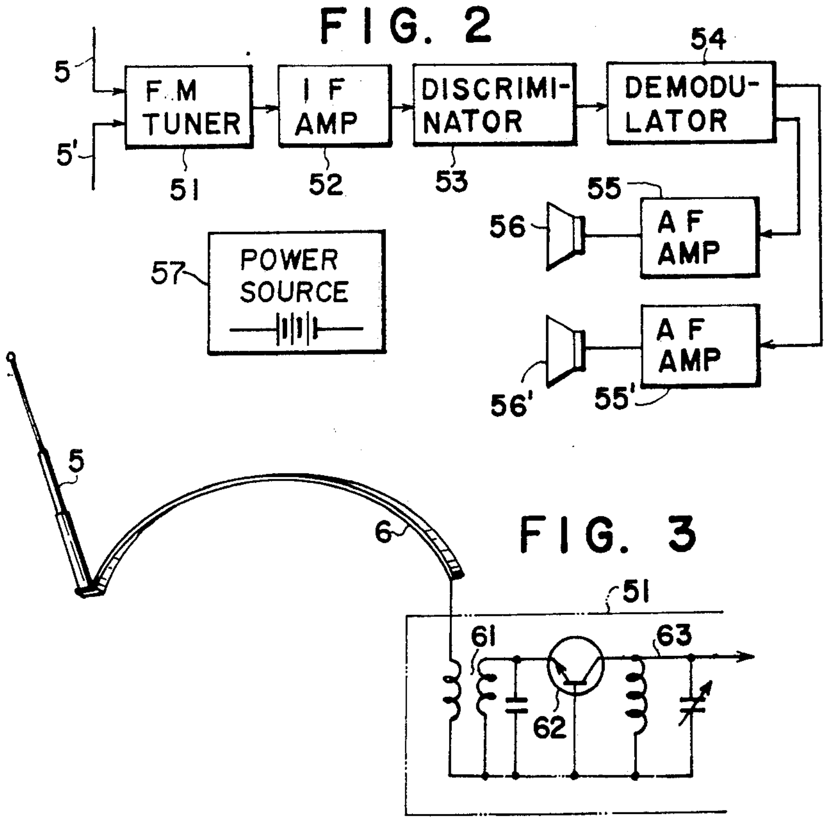
FIG. 2 is a block diagram of the elements required for receiving FM stereophonic broadcasting.
FIGS. 3 and 4 are a set of views showing an antenna unit used in the receiver of this invention.

FIG. 2 is a block diagram of a system required for receiving FM stereophonic broadcasting. In FIG. 2, numerals 5, 5' designate dipole antennas. These dipole antennas normally have a total length of about 150 cm. when used for receiving an FM band of 88 to 108 MHz but shorter dipole antennas may be used by loading them. Alternatively, a unipole antenna having a total length of about 75 cm, or a capacitive antenna, which is even shorter than said unipole antenna, may also be used as is well known in the art. An FM tuner unit 51 comprises a high-frequency amplifier, a matching circuit provided between the antennas and the high-frequency amplifier, a local oscillator and a frequency converter. An IF amplifier unit 52 is usually of a frequency of 10.7 MC. A discriminator unit 53 is normally of the ratio detector type but may be of any other type which is capable of detecting FM waves. An FM stereo signal demodulator unit 54 will be described later with reference to an example of the new circuit thereof. Audio frequency amplifier units 55, 55' are provided for amplifying the demodulated left and right signals respectively and each include a power amplifier for operating a left or right speaker 56 or 56'. The left and right speakers 56, 56' are of substantially the same type as those normally used for headphones. In the following description, therefore, it should be understood that the phone case always has the speaker therein, unless otherwise specified. A power source unit 57 for supplying an electric power to the respective units mentioned above usually consists of a dry battery but a Ni-Cd cell or the like may be employed to render the power source unit rechargeable.

The primary object of the present invention is to propose a type of FM stereo receiver in which all of the elements required for receiving FM stereophonic broadcasting are concentrically or dispersedly arranged in one or more of the constitutional parts of the headphones, particularly in the phone cases 1, 1' or the decorative casing 7 on top of the head pads or in both of them, and which, therefore, is capable of receiving FM stereophonic broadcasting without being connected to any external apparatus, and to propose the detailed structure of such receiver.

The structure of the antenna will be described first with reference to FIGS. 3, 4 and 5.

It is well known that the necessary length of an antenna is generally determined by the frequency and the bandwidth to be received by said antenna and that the gain is reduced with the length of the antenna is shorter than required. The length of an FM band receiving antenna is as described previously. Therefore, in order to obtain sufficient gain, with the antennas 5, 5' arranged as shown in FIG. 1, each of the antennas must be 75 cm. in length which is too long as an antenna for use with headphones. According to the present invention, as shown in FIG. 3, the resilient metal strips 6, by which the left and right phone cases are held on the ears, are used simultaneously as a part or the whole of an antenna. In FIG. 3 there is shown a unipole antenna combined with an auxiliary antenna 5. Namely, one end of the metal strip 6 is connected to the tuner unit 51 comprising an input circuit 61, an RF amplifier 62 and a frequency selection circuit 63. Since the metal strip 6 is normally about 40 cm. in length, the auxiliary antenna 5 is only required to be about 30 cm. in length. In addition, by employing such a structure, there is the advantage that an antenna can be obtained which is excellent in both performance and design. Although in the embodiment shown, the metal strip 6 is used simultaneously as a connecting wire between the antenna 5 and the input circuit 61, it will be obvious that the same effect may be obtained by providing the input circuit 61 in one of the phones and the antenna 5 on the other phone, and connecting the input circuit with the antenna by a separate unshielded connecting wire so as to obtain antenna effect with said connecting wire and said antenna 5.

Figures 4, 5:
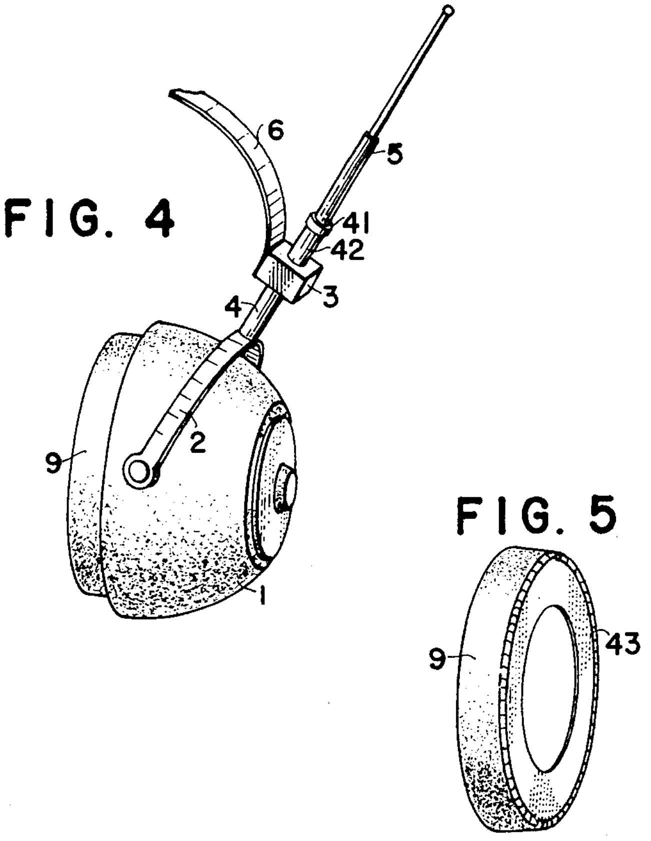
FIG. 5 is a perspective view of an ear pad having an electrically conductive portion.

In FIG. 4 there is shown another form of antenna structure in which the supporting pin 4 for sliding the head bolt member thereon is used simultaneously as the antenna or the auxiliary antenna mentioned above, in addition to the metal strip 6. By employing this structure, the antenna effect of the antenna shown in FIG. 3 can be multiplied. Numeral 41 designates a stopper to prevent the slide case 3 from moving off the supporting pin 4 upwardly and 42 designates an elongate projection formed longitudinally on the pin 4 to prevent rotation of the slide case 3 around the pin 4. The antenna 5 is designed so as to be contracted and stored in the supporting pin 4.

FIG. 5 shown an ear pad 9 which is provided with a conductive member 43 along the periphery thereof so that said conductive member may be brought into contact with the human body when the headphones are applied to the ears. Therefore, when the headphones are used by a listener, his body serves as antenna. The conductive member 43 is connected to the input terminal of the tuner unit, within the ear pad, either directly or through a capacity. It is to be noted that the conductive member 43 may be provided on any accessories other than the ear pad to obtain the same effect, provided that it is contacted by the human body. According to this method, the antenna effect can be obtained by only providing the conductive member 43 on the ear pad 9 and thereby the necessity of providing a separate antenna can be eliminated, which is advantageous in rendering the headphone type stereo receiver compact in form.

FIG. 6 is a set of views showing the phone cases 1, 1' of FIG. 1 as viewed from the front side. As shown, the left and right phono cases 1, 1' are structuurally symmetrical with respect to each other, with the various knobs required for adjusting the state of receiving or for controlling the receiving operation exteriorly evenly distributed to said respective phono cases. In practice, the phone case 1 is provided with a tuning knob 11 and further, for example, with a tone control knob 12, while the phone case 1' is provided, for example, with a volume control knob 11' and further a power source On-Off switch 12' at locations symmetrical with said tuning knob 11 and said tone control knob 12 respectively. The symmetrical configuration of the left and right phone cases 1, 1′ is extremely advantageous not only from the standpoint of design of the headphone type FM stereo receiver but also from the standpoint of cost because a single shaping mold can be used commonly for both phone cases.

FIGS. 7, 8, 9 and 10 are illustrative views of a power source switch which is so designed that the power source is automatically switched "ON" when the headphone type receiver is mounted on the head, while it is automatically switched "OFF" when the receiver is demounted from the head. Referring to FIGS. 7 and 8, numerals 1, 1′ designate the phone cases, 2 the supporting member for each phone case, 6 the head bolt, 9 the ear pads, 90 a lever, 91 and 92 the contact terminals of a switch and 93 a mounting pin. FIG. 8 shows the state of the headphone type receiver as mounted on the head. Since the head belt 6 is made of a resilient material, when the phone cases 1, 1′ are moved away from each other from the positions shown in FIG. 7 to the positions shown in FIG. 8, in mounting the headphone type receiver, the supporting member 2 makes a pivotal movement about the mounting pin 93. Therefore, the lever 90, fixedly connected to the mounting member 2, also moves along with said supporting member 2 and presses the contact terminal 91, whereby the contact terminals 91 and 92 of the switch are closed connecting the receiving circuit with the power source. When the headphone type receiver is demounted from the head, the contact terminal 91 is detached from the contact terminal 92 reversely and the power source is switched "OFF" automatically. FIGS. 9 and 10 show another form of switch which performs the same function as described above. According to this form, contact terminals 94 and 95 of the switch are disposed in the ear pad 9. The ear pad is generally made of an elastic, soft material, such as moltoplen. Therefore, when the receiver is mounted on the head, a pressure is imposed on the side face of the ear pad 9, causing the contact terminal 95 to contact the contact terminal 94, whereby the switch is closed. On the contrary, when the pressure is removed or the headphone type receiver is demounted from the head, the contact terminals 94 and 95 are opened, whereby the power source is disconnected. Although in the embodiment described above, use is made of the resiliency of the ear pad material for opening the terminals 94 and 95, a spring may also be used for the same purpose. Further, instead of using a mechanical switch as described above, an electrical switch making use of a pressure-sensitive solid element, whose resistance value or current value is varied when the element is subjected to a pressure, or a switch making use of a magnetism-sensitive semiconductor, whose current value or resistance value is variable with a change in the surrounding magnetic field, may of course be used to obtain the same effect. It is also to be understood that the switch may be provided in the decorative casing of the head pad. Furthermore, a power source ONOFF main switch may be connected in series to the aforesaid switch to ensure a safe and reliable switching operation, without any detrimental effect to the function of the present device. Because of such arrangement of the switch as described above, the audio frequency power of the headphone type receiver is smaller than that of ordinary radios and whether the power source is "ON" or "OFF" can hardly be recognized upon removal of the receiver from the head. However, use of the switch of the type described is advantageous in eliminating the possibility of the user forgetting to cut off the power source, preventing wasteful consumption of the battery and simplifying the operation, and thus is of great practical advantage.

In producing the present headphone type FM stereo receiver, it is important to reduce the weight of the whole receiver or to give a feeling of light weight to the user. It is also important to reduce the size of the receiver. This may be attained, for example, by the following measures. Namely, the headphone type FM stereo receiver must be provided with the electric parts and the power source means as shown in FIG. 2. Of these parts, the power source is the one which is particularly heavy compared with the other parts. For practical use of the headphone, it is preferable that the loads imposed on both ears are equal, because otherwise the user will have an unpleasant feeling. For this purpose, the power source is disposed in one of the phone cases, while the elements required for receiving FM stereophonic broadcasting, i.e. the FM tuner 51, the IF amplifier 52, the discriminator 53, the FM stereo signal demodulator 54 and the audio frequency amplifiers 55 and 55′, are disposed in another phone case partially or entirely, so as to make the weight on both ears substantially equal. In this way, it is possible not only to make the weight of both phone cases equal but simultaneously to make the size of the phone cases approximately the same, and consequently the headphone type receiver can be made compact as a whole.

In order to give a feeling of light weight to the user, it is important to reduce the vertical load imposed on the ear and support the load by the head. For this purpose, the power source means for supplying an electric power to the FM stereo receiver is disposed inside or on the surface of the member 7 which is located centrally of the head belt 6 and disposed inside or on the surface of said head belt as shown in FIG. 1, and which was previously referred to as a decorative casing. Such an arrangement is advantageous in reducing the weight directly exerted on the ears and facilitating changing the battery. The other elements i.e. the tuner 51, the IF amplifier 52, the discriminator 53, the FM stereo signal demodulator 54 and the audio amplifiers 55 and 55′, may be arranged in one or both of the phone cases 1 and 1′ since they are not heavy as compared with the power source. The loads imposed on the ears may be further reduced by arranging some or all of the elements namely the tuner 51, the IF amplifier 52, the discriminator 53, the FM stereo signal demodulator 54 and the audio amplifiers 55 and 55′ inside or on the surface of the head belt 6, instead of arranging them in the phone cases. This is because the feeling of weight given to the ears can be mitigated by supporting the load by the head rather than by the ears and pain to the ears can be reduced accordingly. Such an arrangement is also advantageous in reducing the size of the phone cases 1 and 1′.

In the headphone type FM stereo receiver described above, the tuning knob is provided on the phone case but in this way the tuning indication is not visible to the user. Another embodiment of the headphone type receiver in which improvements are made in this respect, is shown in FIGS. 11 and 12. With the arrangement shown, the operation is rendered simple and the tuning indication is made visible to the user. Namely, according to this embodiment of the FM stereo receiver, the circuit required for receiving FM stereophonic broadcasting and one of the speakers are disposed in the phone case 1. The tuner 51 comprises a variable capacitance diode 58 for antenna tuning and another variable capacitance diode 59 for oscillation tuning. The variable capacitance diodes 58 and 59 are so designed that their capacitance values and tuning frequencies are varied when a voltage created by a change in resistance value of a variable resistor 50 is impressed on the diodes. Where the tuner 51, disposed in the phone case 1, comprises a conventional variable capacitor, it is convenient to provide the tuning knob on the phone case 1 and it is impossible to locate it at the other places, because the capacitance value of the capacitor is changed by making use of a mechanical change. However, when the variable capacitance diodes are used as shown in FIG. 11, since the capacitance values can be changed by making use of a voltage change, tuner operating means 57 can be located remote from the phone case 1, with the variable resistor 50 disposed therein for operating the variable capacitance diodes. Therefore, the tuning operation can be effected in the range of sight. In addition, since the variable capacitance diode is smaller than the conventional variable capacitor, the phone case or the whole headphone type receiver can be reduced in size. In the arrangement illustrated in FIGS. 11 and 12, the tuner 51, the IF amplifier 52, the discriminator 53, the FM stereo signal demodulator 54 and the audio amplifiers 55 and 55' are disposed in the phone case 1 but, as described previously, these elements may be provided inside or on the surface of the head belt 6 partially or entirely. In this case, the operation of the receiver is simpler, even with the tuning knob provided on the phone case 1, than with the tuning knob located at the member 7 together with the receiving circuit as shown in FIGS. 13 and 14. Namely, FIGS. 13 and 14 show still another structure of the receiver wherein the tuner 51 comprising the variable capacitance diodes 58 and 59, the IF amplifier 52, the discriminator 53, the FM stereo signal demodulator 54 and the audio amplifiers 55 and 55' are arranged in the member 7 provided on the head belt 6 and the variable resistor 50 by which the voltage impressed on the variable capacitance diodes 58 and 59 is changed for tuning is disposed in the phone case 1. Similar to the arrangement shown in FIGS. 11 and 12, such an arrangement is advantageous in facilitating the operation and reducing the size of the receiver.

In order to make the receiver compact in form, still another arrangement is proposed as shown in FIG. 15. According to this arrangement, volume control is effected by switching the branch points of fixed resistors to contacts A, B, C and A', B', C' by means of switches $S_1$ and $S_2$ respectively. The switches $S_1$ and $S_2$ can be made smaller than the conventional double variable resistor. Accordingly, the headphone type FM stereo receiver can be made compact in form. The switches $S_1$ and $S_2$ are operated simultaneously to control the volumes of the left and right stereo signals at the same time. For the receiver to produce a stereophonic effect, it is essential that the right signal and the left signal are balanced with each other. For this purpose, the arrangement is made as shown in FIG. 15. Namely, the tuner 51, the IF amplifier 52, the discriminator 53, the FM stereo signal demodulator 54, one of the audio frequency amplifiers 55 and the volume control are accommodated in the phone case 1, and another audio frequency amplifier 55' and a volume balance control 71 in the other phone case 1'. By disposing one of the audio frequency amplifiers 55' in the phone case 1', the number of circuits in the phone case 1 is reduced and, therefore, the size of the phone case 1 can be reduced. Further, the arrangement of FIG. 15 is advantageous in that the number of connecting wires between the phone cases 1 and 1' can be reduced. This is because, if the volumes of the right and left signals are balanced by changing the gains of said signals by providing a volume balancing variable resistor 72 as shown in FIG. 16, a connecting wire D is required. Therefore, the arrangement of FIG. 15, wherein the right and left signals are balanced by changing the gain of only one of the audio frequency amplifiers, is simpler. In this case, the variable resistor 71 is connected in series with the audio frequency amplifier 55. Therefore, by previously setting the gain of the audio frequency amplifier 55' higher than that of the audio frequency amplifier 55, a balance in volume can be attained by controlling the volume of only one of the right and left signals by means of the variable resistor 71.

In the present headphone type FM stereo receiver, it is impossible to use a large power source means and, therefore, it is necessary to minimize the current used, for the purpose of prolonging the service life of the battery. FIG. 17 shows a circuit which enables a minimum current to be used effectively. This circuit is particularly effective where the power source voltage is high and the current capacity is small. In the past, all of the tuner 51, the IF amplifier, the FM stereo signal demodulator 54 and the audio frequency amplifiers 55 and 55' have been connected in parallel as shown in FIG. 18, and, therefore, the total current used is the sum of the currents flowing through the respecitve elements. If, in this case, the required voltage is lower than the power source voltage, the power source voltage is lowered by a resistor 74. However, according to the arrangement shown in FIG. 17, a block E comprising the tuner 51, the IF amplifier 52 and the audio frequency amplifier 55, connected in parallel with each other, and a block F comprising the FM stereo signal demodulator 54 and the audio frequency amplifier 55', connected in parallel with each other, are connected in series. Since the audio frequency amplifiers 55 and 55' are class A amplifiers, the current is not changed by said audio frequency amplifiers. Further, by equalizing the currents flowing through the blocks E and F, one half of the voltage of the power source 57 is supplied to each of the blocks E and F. Thus, it will be understood that the arrangement of FIG. 17 is effective where the current of a high voltage power source is used at a low level, and is economical as the current used can be minimized. Where it is desired to make the currents flowing through the blocks E and F equal or to adjust the currents to a prescribed proportion, the current for a specific block can be adjusted by inserting a resistor 73 in the circuit as shown in FIG. 17, as will be readily appreciated.

The audio frequency output of the present headphone type FM stereo receiver is so small that the stereophonic sound is inaudible when the receiver is demounted from the head or moved away from the ears. Where the receiver is desired to be used without mounting it on the head at an audible volume as large as the ordinary radio, a device shown in FIGS. 19 and 20 is used. The device is provided with a charger 21 for charging the power source of the headphone type FM stereo receiver.

The device 20 comprising speaker horns 22, 22' and the charger 21, is provided with a charging plug 25, connected to said charger 21, and a supporting rod 26 for supporting the headphone receiver. The charger 21 is provided with an ON-OFF switch 29. The device 20 has a receiver mounting block 27 and at the center of the side walls 28, 28' of said mounting block 27 are formed openings 23, 23' in communication with the respective speaker horns 22, 22'. The other ends of the speaker horns 22, 22' are open in the front wall of the main body of the device as at 24, 24'. In using the device, the headphone type FM stereo receiver is mounted on the mounting block 27 in such a manner that the ear pads 9, 9' of the phone cases 1, 1' are just fitted over the openings 23, 23' of the speaker horns 22, 22' under the biasing force of the head belt 6, as shown in FIG. 20, and thereby a stereophonic sound of large volume is generated from the openings 24, 24'. The charging plug 25, connected to the charger 21, is located in such a position that it is connected with a charging plug 30 in the phone case 1' when the receiver is mounted on the mounting block 27 in the manner described. Upon placing the power source ON-OFF switch 29 of the charger in an "ON" position, the power source means of the headphone type FM stereo receiver is charged and at the same time the volume of the receiver is increased to an audible level. The device may also be used for storing the receiver when the receiver is not in use.

The headphone type FM stereo receiver must be provided in a compact form. For this purpose, it is important to reduce the size of the FM stereo demodulator 54, which tends to be large in size due to a number of coils comprised in the circuit thereof. According to the present invention, therefore, the circuit of the stereo demodulator is arranged as shown in FIG. 21.

Namely, a FM stereo signal detected by the discriminator 53 is impressed on a terminal G. The signal is amplified by a transistor 14 and supplied to a 19 KHz tuning coil 66, connected to the collector of said transistor, to be taken out as a 19 KHz signal. Then the 19 KHz signal thus taken out is doubled into a 38 KHz signal by diodes 67, 68 connected to the secondary winding of the coil 66 and the doubled signal is supplied to an amplifier, consisting of transistors 16 and 17 connected with each other in series, to be amplified thereby. The base bias of the transistor 16 is provided by a D.C. feedback path through a resistor 76 from the emitter of the transistor 17 at the same time the resistor 76 serves as an A.C. negative feedback path for the direct-coupled amplifier consisting of the transistors 16 and 17 thereby contributing to stable operation of the amplifier. Further, 38 KHz signals of opposite polarities are taken out from the emitter and the collector of the transistor 17 through a resistor 19 and a condenser 32 and through a resistor 18 and a condenser 31 respectively. The stereo signal taken out at a resistor 65 of the collector of the transistor 14 is added through resistors 33 and 33 and 34, and the resultant signals are impressed on the connection between diodes 35 and 37 and on the connection between diodes 36 and 38 respectively for switching, said switching diodes 35, 36, 37 and 38 being connected with each other in the form of a closed loop. The right and left audio signals taken out separately from the connection between the diodes 35 and 36 and the connection between the diodes 37 and 38, are taken out from terminals L and R respectively. While in the circuit described above, the 38 KHz signals are taken out from the emitter and the collector of the transistor 17, as described above, in a conventional circuit a coil has been used in place of the transistor 17 and a 38 KHz tuning coil has been connected to the collector of the transistor 16, and the 38 KHz signals of opposite polarities have been taken out from the opposite ends of the secondary winding of the said coil by earthing said secondary winding at its center or by impressing the stereo signal on the center of said secondary winding. According to this method, however, it has been impossible to reduce the size of the circuit because the 38 KHz tuning coil is large in size. The circuit according to the present invention can be made smaller than the conventional one owing to the use of the transistor 17. Furthermore, according to the invention the portion encircled by the dotted line in FIG. 21 can be provided in the form of an integrated circuit and thereby the size of the entire circuit can be further reduced (a circuit comprising a coil cannot be formed into an integrated circuit). It is also to be noted that the circuit of the present invention is advantageous in reducing noise because, since the 38 KHz signals are taken out from the emitter and the collector of the transistor 17 in opposite polarities and then the stereo signals are taken out separately through the switching diodes 35 and 36 and through the switching diodes 37 and 38, noises contained in said 38 KHz signals are impressed on each other in opposite directions. Namely, the circuit arrangement of the invention is advantageous not only in facilitating miniaturization of the circuit but also in reducing noise. Incidentally, a condenser 77 and a variable resistor 78, connected to the emitter of the transistor 14, are provided for the purpose of separation adjustment. According to the switching system employed in the present invention, the 38 KHz signals to be switched are not of rectangular wave but of sine wave and, therefore, the L and R components (sub-channel components) must be amplified by an excess of $2/\pi$. It is for this reason that the condenser 77 and the variable resistor 78 are provided for compensation, and the separation of the stereo signals is adjusted by changing the compensation level by the variable resistor 78. The resistors 33 and 34 may be substituted by choke coils respectively.

It is also to be noted that according to the present invention the rotational angle of the tuning knob is made about twice as large as that of the variable condenser so as to facilitate the tuning operation. In addition, a frequency scale is provided on the tuning knob to indicate tuning frequencies. The structures of various dial means are shown in FIGS. 22, 23, 24, 25 and 26.

Dial means of the type having markings, such as a scale, provided on the knob proper have been well known in the art, but these dial means without exception have their knobs mounted directly on the rotary shaft of a variable condenser and the scale is provided only over one half of the circumferential length of the knob (because the variable condenser is generally rotated through an angle of 180°). Therefore, the indication is quite trouble-some and much difficulty is encountered in the tuning operation.

The dial means of the present invention eliminates the foregoing drawbacks. Namely, according to the present invention a separate operating shaft is provided so that a scale or the like can be provided over the entire circumference of a knob. Referring to FIG. 22, a hole 102 is bored through the front panel of a cabinet 101 for mounting a knob 107. A mounting plate 103 is fixedly secured interior of the cabinet 101, with a variable condenser 104 and a bearing 105 mounted thereon at a predetermined interval. An operating shaft 106 is rotatably supported by the bearing 105 and one end thereof is extending outwardly of the cabinet 101 through the throughhole 102, with the knob 107 mounted thereon. An annular member 108 is fitted on the bearing 105 and has lugs 109 and 110 formed at the periphery thereof. One of the lugs 109 is received in a throughhole 111 formed in the mounting plate 103, while another one 110 is flexed in an opposite direction to said lug 109. A pulley 112 is fixed to another end of the operating shaft 106 remote from the knob 107. The pulley 112 is provided at the periphery thereof with a stopper 113 for engagement with the lug 110. A dial drum 114 is fixed on a rotary shaft 115 of the variable condenser 104 and operatively connected with the pulley 112 by way of a dial rope 116. The diameter of the dial drum 114 is about twice that of the pulley 112. The knob 107 is provided over the entire circumference of the front face thereof with a scale 117 as shown in FIG. 23. On the front face of the cabinet 101 is provided an index marking 118 for co-operation with the scale 117. In the embodiment described above, the variable condenser 104 is arranged for rotation through an angle of 180° as usual but the operating shaft 106 is rotated through an angle of 360° since the diameter of the dial drum 114 is twice that of the pulley 112. In other words, the operating shaft 106 must be rotated just a complete turn to rotate the variable condenser 104 through an angle of 180°. This makes it possible to provide the scale 117 over the entire circumference of the knob 107 and accordingly to increase the pitch of the scale 117. Thus, reading the individual scale markings can be facilitated and adjustment of the variable condenser 104 can be effected with much ease. Although in the foregoing description it is expediently state that the knob is rotatable through 360°, the knob is in practice rotatble through as angle slightly less than 360° due to the presence of the stopper 110. This difference, however, can be eliminated by making the diameter proportion between the pulley 112 and the drum 114 slightly smaller than 2.

FIG. 25 shows a modifidation of the dial means, in which the pulley 112 is provided with means for preventing slippage of the dial rope 116. Namely, a flange 119 having a portion cut away as at 120 is formed centrally of the peripheral surface of the pulley 112 and the dial rope 116 is wound on the pulley on both sides of the flange 119 extending across said flange through the cutout portion 120. FIG. 26 shows another modification of the dial means, in which the rotary shaft 115 of the variable condenser 104 and the operating shaft 106 are operatively connected with each other without using the dial drum 114 and the dial rope 116. This arrangement also brings about the same effect as those of the preceding embodiments. Namely, according to this arrangement, the rotary shaft of the variable condenser 104 and the operating shaft 106 are connected through the intermediary of intermeshing gears 121 and 122, the gear ratio of the gear 121 to the gear 122 being 1.7 : 1, which is approximately 2.

As may be understood from the embodiments described above, the dial means according to the present invention comprises a separate operating shaft for mounting a knob thereon, which is operatively connected to the rotary shaft of the variable condenser and through which the rotation of the knob is transmitted to the variable condenser in such a manner that the rate of rotation of the variable condenser becomes about one half of that of the knob. By employing such arrangement, it becomes possible to provide a scale over the entire periphery of the knob, and accordingly the scale can be read with much ease and adjustment of the variable condenser can be effected very simply as stated previously.

With the present headphone type FM stereo receiver mounted on the head, the phone cases are applied to the ears to listen to the sound generated by the speakers accommodated in said respective phone cases. Therefore, the phone cases must be provided with a cushion member. Means for mounting the cushion member is illustrated in FIGS. 27, 28, 29 and 30. By employing such mounting means, the cushion member can be mounted or removed easily and the appearance of the receiver is prevented from being spoiled.

In general, it is customary to use an adhesive for fixing the cushion member to a headphone or radio receiver. However, use of an adhesive is practically disadvantageous in that the cushion member once fixed to the headphone or radio receiver by means of the adhesive cannot be detached therefrom. Another method which has been employed for mounting the cushion member or an ear pad on the headphone is to fit said cushion member or ear pad on the rim of the headphone but such a method is still disadvantageous because the appearance of the headphone as a whole is spoiled very much. The ear pad mounting means shown in FIGS. 27, 28, 29 and 30 eliminates the drawbacks of the conventional means, and is so designed that mounting and removal of the ear pad can be effected very easily. In describing the ear pad mounting means of this invention with reference to the drawings, the phone case 131 has a boss 132 formed integrally on the inner surface thereof and an annular closure member 133 is secured at its periphery to said bose 132 by means of screws 135, said closure member being formed with a sound releasing opening 134 centrally thereof. A speaker 136 is mounted on the inside wall of the closure member 133. Ahesively attached to the outside wall of the closure member is a mounting plate 137 which consists of a net of relatively hard material. The mounting plate 137 is provided with outwardly projecting cutout lugs 138. An ear pad 139 is disposed exterior of the mounting plate 137 and provided on the inner surface thereof with engaging bands 140 for engagement with the respective cut-bent lugs 138. Each of the bands 140 is adhesively connected to the ear pad 139 only at the opposite ends thereof, so as to form an air space between the ear pad and the central portion of the band. The ear pad 139 is secured to the mounting plate 137 by inserting the cutout legs 138 into the air spaces defined by the respective bands 140.

Namely, according to the present invention the ear pad 139 can be mounted on or demounted from the headphone easily simply by deforming only the flexible ear pad to some extent and inserting the cutout lugs 138 into the air spaces formed between the ear pad and the respective bands 140. In addition, since the ear pad can be mounted interior of the phone case, the appearance of the headphone is not spoiled by the ear pad at all, and thereby the commercial value of the headphone can be greatly enhanced. In the illustrations of the drawings, the cutout lugs are formed extending radially inwardly but it will be obvious that the same effect can be obtained by forming the cutout lugs to extend radially outwardly.

As will be understood from the foregoing description, the headphone type FM stereo receiver according to the present invention enables a listener to enjoy FM stereophonc broadcasting while moving around, by only holding the headphone on both ears and without connecting the headphone with other radio receiving apparatus. Namely, the headphone alone is capable of receiving FM stereophonic broadcasting and, therefore, is the ideal FM stereo receiver for individual use. In addition, may new concepts are included in the detailed structure of the receiver as described hereinabove for convenient usage of the receiver.

What is claimed is:

1. An FM stereo signal demodulator for FM stereo receivers comprising a first transistor having its base connected to receive an FM stereo signal from said discriminator, a 19 KC tuning coil connected to the collector of said first transistor, frequency multiplying diodes connected to the secondary winding of said tuning coil, a direct coupled amplifier consisting of second and third transistors, the emitter of said third transistor being connected to the base of said second transistor through more than one resistor so as to obtain the bias of said second transistor, and to obtain the negative feedback loop for the amplifier composed of said second and third transistors, and a switchng circuit consisting of four diodes connected in the shape of a ring, the arrangement being such that a signal received by the 19 KC tuning coil is multiplied to a 38 KC signal by the frequency multiplying diodes, the resultant 38 KC signal being impressed on the direct-coupled amplifier to obtain 38 KC outputs of opposite polarities from the emitter and collector of the third transistor, and said 38 KC output being coupled with a stereophonic signal supplied from the first transistor and then impressed on a pair of connections located at opposite ends of one of the diagonal lines of the switching circuit, whereby separated left and right signals are taken out from opposite ends of another diagonal line of said switching circuit.

2. A headphone type FM stereo receiver accommodating a tuner including an antenna for receiving FM stereophonic broadcasting, an IF amplifier, a discriminator, an FM stereo signal demodulator, a left and right audio frequency amplifier and power source means for supplying electric power to said respective elements in a headphone composed of a left and a right phone case and a head belt bridging said phone cases with each other, said receiver being capable of receiving FM stereophonic broadcasting without being connected to an external apparatus, wherein said FM stereo signal demodulator comprises a first transistor having its base connected to receive an FM stereo signal from said discriminator, a 19 KC tuning coil connected to the collector of said first transistor, frequency multiplying diodes connected to the secondary winding of said tuning coil, a direct-coupled amplifier consisting of second and third transistors, the emitter of said third transistor being connected to the base of said second transistor through more than one resistor so as to obtain the bias of said second transistor, and to obtain the negative feedback loop for the amplifier composed of said second and third transistors, and a switching circuit consisting of four diodes connected in the shape of a ring, the arrangement being such that a signal received by the 19 KC tuning coil is multiplied to a 38 KC signal by the frequency multiplying diodes, the resultant 38 KC signal being impressed on the direct-coupled amplifier to obtain 38 KC outputs of opposite polarities from the emitter and collector of the third transistor, and said 38 KC outputs being coupled with a stereophonic signal supplied from the first transistor and then impressed on a pair of connections located at opposite ends of one of the diagonal lines of the switching circuit, whereby separated left and right signals are taken out from opposite ends of another diagonal line of said switching circuit.

* * * * *